Feb. 9, 1932.  E. A. NELSON  1,843,985
MEANS FOR SECURING DEMOUNTABLE WHEEL PARTS
Filed Oct. 9, 1929

INVENTOR.
EMIL A. NELSON
BY
John P. Tarbox
ATTORNEY.

Patented Feb. 9, 1932

1,843,985

UNITED STATES PATENT OFFICE

EMIL A. NELSON, OF DETROIT, MICHIGAN, ASSIGNOR TO BUDD WHEEL COMPANY, OF PHILADELPHIA, PENNSYLVANIA, A CORPORATION OF PENNSYLVANIA

MEANS FOR SECURING DEMOUNTABLE WHEEL PARTS

Application filed October 9, 1929. Serial No. 399,871.

My invention relates to demountable wheels, and more particularly to automobile disc wheels in which the wheel body is clamped to the hub by an annular series of clamping bolts or studs.

In wheels of this class, it is a usual construction to have the clamping bolts or studs secured to a radial hub flange. The central portion of the wheel disc has a series of apertures to receive the studs, the outer ends of which are threaded to receive cap nuts which, when screwed home, clamp the wheel disc firmly against the hub flange. When these nuts are of the well-known Michelin self-tightening class, they are provided with conical seats directly engaging correspondingly shaped apertures in the wheel disc, thereby clamping the same in place.

It is a main object of my invention to provide a simple yet highly efficient means to prevent loss of the nuts in wheels of this class, when changing wheels or otherwise, and I attain this object by the provision of a single unitary annular element having suitable apertures, within which the nuts are permanently secured, but in which they have sufficient axial movement to permit each independently of the others to be fully unscrewed. By my invention this element does not have any clamping function, its sole function being the retention together of the entire annular series of nuts. This permits me to make it not only of very light weight, but also easy to manufacture, since I prefer to constitute it a very simple sheet metal stamping of channel cross section. The apertures in the nut retaining element are preferably so formed that their surrounding walls are somewhat yielding, so that the nuts, which are each provided at their inner portions with an annular enlargement slightly larger than the diameter of the apertures in the retaining element, may, because of the yielding nature of the aperture walls, have these enlargements driven through the apertures as by a sharp hammer blow. When so applied to the nut retaining element, the nuts will be permanently associated therewith.

In the accompanying drawings in which I have illustrated a preferred embodiment of my invention—

Figure 2:
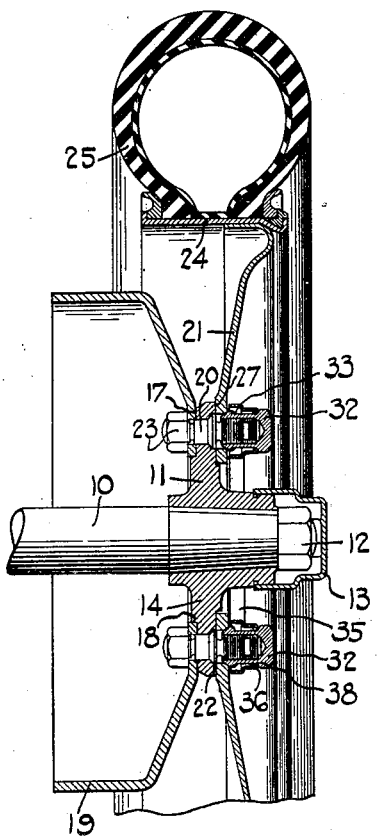
Figure 2 is a partial section of the wheel, the section being taken approximately on the line 2—2 of Fig. 1.

Numeral 10 represents the rear axle of a vehicle upon which is keyed the hub body 11 and locked axially in position on the usual conical axle seat by the nut 12. The usual hub cap 13 is shown screwed onto the threaded outer end of the hub.

The hub body 11 is provided intermediate its ends with a radially extending flange 14 having an outer substantially plane disc mounting face 15 and a disc centering shoulder 16 at the inner margin of the mounting face. The flange 14 has an inner plane face 17 having an inner marginal shoulder 18 and serves as a mounting surface for the brake drum 19. The flange 14 carries an annular series of securing studs 20 which constitute a part of the bolting means whereby the body disc 21 and the brake drum 19 are secured to the hub.

These studs are each provided intermediate their ends with a collar 22 having a tapered inner face, this collar being adapted to seat within a corresponding recess in the hub flange. The rear end of each stud is threaded, and receives a nut 23 to clamp the brake drum and stud securely to the hub flange. The body disc 21 is of tapered cross section and is, in the present instance, dished inwardly. It carries on its outer peripheral portion, which is flanged over, the tire carrying rim 24 upon which is seated the tire 25. At its inner portion the body disc bears against the mounting face 15 in inner and outer zones 26 and 27 by reason of the provision of a shallow annular recess 28 surrounding its central aperture. In the zone of the annular recess 28 the body disc is provided with an annular series of apertures 29 complemental to the series of studs 20.

The apertures 29 in the body disc are of substantially larger diameter than the studs 20 and are formed with conical seats 30 which coact with complemental conical seats on the inner ends 31 of a series of cap nuts 32 to center and clamp the body disc on the hub when said nuts are screwed home on the studs 20. Each nut is provided with an inner collar 33 of slightly larger diameter than the body of the nut, and an outer enlarged head 34.

Figure 1:
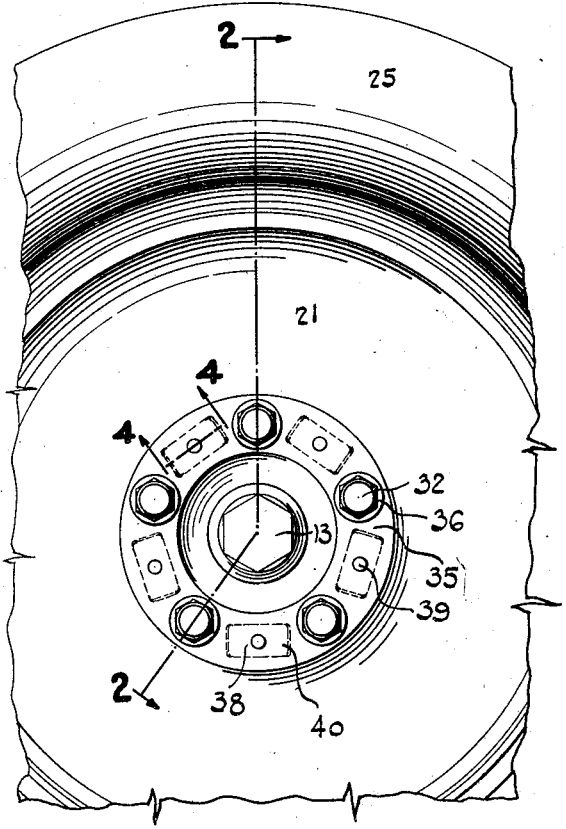
Figure 1 is a partial end view of a wheel showing my invention applied thereto.
Figure 3:
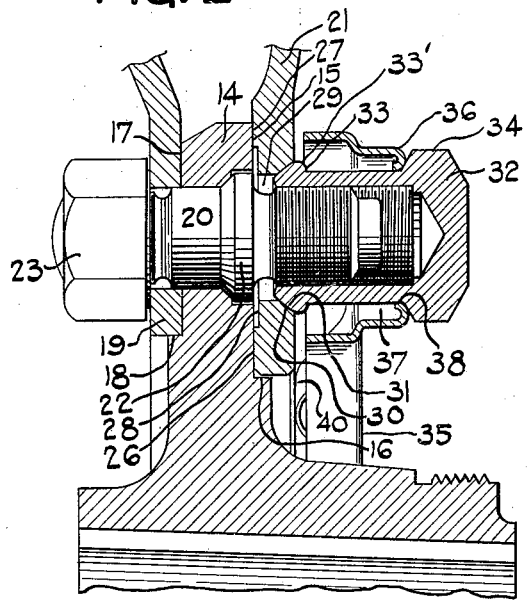
Figure 3 is a detail section through one of the connecting studs similar to the section shown in Fig. 2, but on a greatly enlarged scale.
Figure 4:
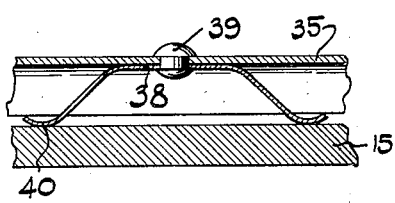
Figure 4 is a detail section taken on the line 4—4 of Fig. 1.

To prevent the loss of the nuts when changing wheels or otherwise, I provide an annular member 35 of channel cross section and of relatively light gauge, the whole preferably made out of a single sheet metal stamping, as shown. This member is of a width radially somewhat greater than the diameter of the heads 34 of the nuts 32, see Figs. 1 and 3, and is provided with outwardly projecting bosses 36 corresponding in number and spacing to the nuts 32. These bosses are formed with apertures 37 of a diameter to receive the bodies of the nuts with an easy sliding fit. The inner walls of these apertures are formed by inturned flanges 38 which possess an inherent resilience. By this construction a nut 32 may be permanently connected to the annular retaining member 36 by placing its conical inner ends 31 against the inturned annular flanges 38 of an aperture 37 and then giving the head of the nut a sharp hammer blow, which will drive the collar 33 yieldingly through the aperture 37, the walls of which will thereupon spring inwardly to their original position and thus keep the nut secured to the ring against any ordinary application of pressure, as for example, a force applied by hand. By rounding the outer shoulder of the collar or bead 33 as shown at 33', the nut can be forcibly removed from the retaining ring, if desired, by placing a punch or its equivalent within the hollow of the nut, and giving it a sharp blow with a hammer in axial alignment with aperture walls.

The axial width of the retaining member 36 at the bosses 37 is slightly less than the distance from the inner side of the head of a nut to the outer face of the body disc when the nut is screwed home, so that the ring has slight play in the axial direction.

To take up this play and prevent rattling, I provide means for yieldingly pressing the annular member 36 outwardly against the heads of the nuts 32. Such means may comprise flat springs 38 secured as by rivets 39 to the member 36, at their middle portions. On opposite sides of the securing means, they are bent inwardly to extend beyond the channel section, their ends 40 which bear yieldingly against the face of the disc being curved up, so as not to dig into the metal of the discs.

The relative axial movement permitted between the nuts and the retaining member 36 is sufficiently great, by my construction, to allow the complete unscrewing of each nut independently of the other nuts.

While I have herein described my invention as applied to a wheel securing means embodying studs and nuts, it will be understood that it is also applicable to that class of wheels in which the discs are bolted to the hub by studs screwing into the hub flange, and when I use the word "bolting means" in the following claims, that expression is to be understood to mean either nuts or studs.

What I claim is:

1. In a wheel, a disc wheel body adapted to be bolted to a hub, an annular series of securing means including bolting members each having an elongated body portion and enlargements at the ends of said body portion, an annular retaining member having a series of apertures loosely receiving the body portions of said bolting members to permit free axial movement thereof relative to said retaining member within the limits provided by said enlargements which normally retain the bolting members on the retaining member, said retaining member, when the bolting members are screwed home, having some play between the outer enlargements on the bolting members and the disc wheel body, and spring means secured to the inner side of said annular member and having a portion thereof bearing against said disc wheel body, whereby the retaining element is yieldingly held against the outer enlargements on the bolting means.

2. In a wheel, a disc wheel body adapted to be bolted to a hub, an annular series of securing means including bolting members each having an elongated body portion and enlargements at the ends of said body portion, an annular retaining member having a series of apertures loosely receiving the body portions of said bolting members to permit free axial movement thereof relative to said retaining member within the limits provided by said enlargements which normally retain the bolting members on the retaining member, said retaining member, when the bolting members are screwed home, having some play between the outer enlargements on the bolting members and the disc wheel body, and a plurality of spring clips secured to the inner side of said annular member between their ends and having their ends inwardly bent and bearing against the outside face of the disc wheel body to yieldingly keep the retaining member at the outer limit of its play.

In testimony whereof I hereunto affix my signature.

EMIL A. NELSON.